United States Patent Office 3,801,658
Patented Apr. 2, 1974

3,801,658
ISOMERIZATION PROCESS
Peter John Nicholas Brown, Epsom, England, assignor to BP Chemicals International Limited, London, England
No Drawing. Filed Mar. 6, 1972, Ser. No. 232,248
Claims priority, application Great Britain, Mar. 16, 1971, 6,973/71
Int. Cl. C07c 21/04
U.S. Cl. 260—654 R                        4 Claims

ABSTRACT OF THE DISCLOSURE

This invention relates to a process for the isomerization of dichlorobutenes using a catalyst composition comprising copper compounds and alkyl or aryl substituted ureas.

---

The present invention relates to a process for the preparation of 3,4-dichlorobutene-1 by the isomerization of 1,4-dichlorobutene-2 or 1,4-dichlorobutene-2 by the isomerization of 3,4-dichlorobutene-1.

The dichlorobutene obtained by the chlorination of butadiene is a mixture of the isomeric compounds 1,4-dichlorobutene-2 and 3,4-dichlorobutene-1, comprising approximately 60% of the former and about 40% of the latter. These two isomers usually exist in equilibrium in the mixture, the proportion depending on the conditions of preparation.

The usual methods of isomerizing 1,4-dichlorobutene-2 to 3,4-dichlorobutene-1 or 3,4-dichlorobutene-1 to 1,4-dichlorobutene-2 consist of heating the mixed isomers with one or more of copper, iron, zinc, titanium, aluminium, zirconium, etc., metal salts as catalysts or heating the isomers in the absence of catalysts. Whichever process is used for the isomerization the rate of conversion is undesirably slow, high temperatures are required to get useful yields of the right isomer, and some unwanted by-products are formed.

It has now been found that the use of a specific catalyst composition appreciably accelerates the rate of the isomerization reactions.

According to the present invention a process for the isomerization of 1,4-dichlorobutene-2 to 3,4-dichlorobutene-1 or for the isomerization of 3,4-dichlorobutene-1 to 1,4-dichlorobutene-2 comprises contacting the compound to be isomerized with a catalyst composition comprising one or more compounds of copper and an alkyl or aryl substituted urea.

The alkyl or aryl substituted urea used in the catalyst composition of the present invention may be mono-, di-, tri- and tetra-alkyl or aryl substituted derivatives. Specific examples illustrating the preferred alkyl or aryl substituted ureas include methyl urea, ethyl urea, isopropyl urea and phenyl urea. These alkyl and aryl substituents in the urea may be further substituted by groups such as alkoxy and aryloxy groups. An example of such a compound is phenetyl urea.

The compounds of copper that may be used in carrying out the process of the present invention include both organic salts and inorganic salts of copper. Suitable examples are the halides, acetates, oleates, stearates and naphthenates of copper, e.g. cuprous chloride, cupric chloride, cupric acetate and cupric naphthenate. Of these, cupric naphthenate is preferred since it has a high solubility in dichlorobutenes.

The amount of the alkyl or aryl substituted urea present in the catalyst composition of the present invention may vary over a moderately wide range of between 0.5 and 10% by weight of the total composition consisting of catalyst and dichlorobutene.

The isomerization reaction of the present invention may be carried out between temperatures of 80° and 160° C. preferably between 100° and 130° C. at atmospheric, super atmospheric or sub-atmospheric pressures.

The process of the present invention may be performed by using a batch process or a continuous process. It is preferable to carry out the process continuously. If it is desired to convert 1,4-dichlorobutene-2 to 3,4-dichlorobutene-1, the former or the direct chlorination product of butadiene previously described and preferably freed from high boilers is fed continuously to a reactor which contains the catalyst system. This is heated and pure 3,4-dichlorobutene-1 distilled off through a fractionating column. The apparatus is preferably maintained under reduced pressure because it is neither neecssary nor desirable to conduct the reaction at the normal boiling point of the dichlorobutenes and distillation can take place from the reactor itself. Since 3,4-dichlorobutene-1 has a lower boiling point than 1,4-dichlorobutene-2 the equilibrium of the reaction is displaced in favor of the former and all the 1,4-dichlorobutene-2 which is fed to maintain a constant level in the reactor, is thus converted to 3,4-dichlorobutene-1. It should be noted that there is no loss of catalyst in the 3,4-dichlorobutene-1 distilled off. However, since a very small proportion of the dichlorobutenes is converted to high boilers, it is necessary to remove a small stream from the reactor as liquid to prevent accumulation of the high boiler. This stream is subjected to separate distillation to recover the dichlorobutene content which is then recycled to the reactor. In the operation the catalyst is left in the high boiler stream and hence a very small make-up of catalyst may have, in practice, to be added to the reactor. This should be sufficient to maintain the preferred reaction rate.

In the alternative case, where it is desired to convert 3,4-dichlorobutene-1 to 1,4-dichlorobutene-2 the mixed dichlorobutenes are again fed to a continuous reactor system as previously described but in this case, in order to separate the 1,4-dichlorobutene-2, a liquid stream is taken from the reactor to the appropriate point near the base of the fractionating column, not attached to the reactor, and provided with its own reboiler. 3,4-dichlorobutene-1 is removed from the head of the column and recycled back to the reactor and 1,4-dichlorobutene-2 vapor removed near the base of the column but below the feed point. The catalyst containing stream from the reboiler of the column is returned to the reactor, a suitable proportion being removed for separate distillation, to prevent accumulation of high boilers in the reactor. A regular addition of catalyst to the reactor is made to replace that which is removed in order to maintain the reaction rate.

The process of the present invention is further illustrated by the following examples.

EXAMPLES (A) Cuprous chloride (0.5 part) and 3 parts of an additive shown in Table 1 were added to 1,4-dichlorobutene-2 (100 parts). The mixture was heated very quickly to 120° C., and, at various times, samples were removed and analyzed by gas phase chromatography. From the plot of conversion to 3,4-dichlorobutene-1 against time, the conversion after 90 mins. was measured.

The results of these experiments are shown in Table 1.

(B) Cupric naphthenate (3 parts of a commercial product containing 5% w./w. Cu metal) and 3 parts of an additive shown in Table 2 were added to 1,4-dichlorobutene-2 (100 parts). The mixture was heated very quickly to 120° C. and, at various times, samples were removed and analyzed by gas phase chromatography. From the plots of conversion to 3,4-dichlorobutene-1 against time, $R_{10}$ [time (min.) taken to attain 10% conversion to 3,4-dichlorobutene-1] was measured.

A control isomerization of 1,4-dichlorobutene-2 (100 parts) with the addition of only cupric naphthenate (3 parts) was conducted simultaneously in the same way. From the plot of conversion to 3,4-dichlorobutene-1 against time, $C_{10}$ [the time (min.) taken to attain 10% conversion to 3,4-dichlorobutene-1] was measured.

The results of these experiments are shown in Table 2.

(C) As in (B) but using 1.7 parts cupric oleate in place of 3 parts cupric naphthenate.

The result of this experiment is shown in Table 3.

(D) As in (B) but using 1.5 parts cupric stearate in place of 3 parts cupric naphthenate.

The result of this experiment is shown in Table 4.

TABLE 1

| Catalyst | Additive | Percent conversion after 90 mins. |
|---|---|---|
| Cuprous chloride | Isopropyl urea | 21.8 |
| | Phenyl urea | 21.6 |
| | Ethyl urea | 20.2 |
| | Methyl urea | 10.3 |
| | Tetramethyl urea | 8.9 |
| | None | ¹2.7 |
| | para-Phenetyl urea | 22.4 |
| | meta-Tolyl urea | 21.0 |
| | 1,3-dibenzyl urea | 20.2 |
| | 1,3-dicyclohexyl urea | 14.9 |

¹ Average value (not according to the invention).

TABLE 2

| Catalyst | Additive | $\dfrac{C_{10}}{R_{10}}$ |
|---|---|---|
| Cupric naphthenate | Methyl urea | 6.00 |
| | Phenyl urea | 4.24 |
| | Tetramethyl urea | 3.26 |
| | Isopropyl urea | 2.03 |
| | Ethyl urea | 1.60 |
| | meta-Tolyl urea | 4.75 |
| | para-Phenetyl urea | 3.78 |
| | 1,3-dibenzyl urea | 2.31 |

TABLE 3

| Catalyst | Additive | $\dfrac{C_{10}}{R_{10}}$ |
|---|---|---|
| Cupric oleate | Phenyl urea | 4.09 |

TABLE 4

| Catalyst | Additive | $\dfrac{C_{10}}{R_{10}}$ |
|---|---|---|
| Cupric stearate | Phenyl urea | 1.68 |

I claim:

1. A process for the isomerization of 1,4-dichlorobutene-2 to 3,4-dichlorobutene-1 or for the isomerization of 3,4-dichlorobutene-1 to 1,4-dichlorobutene-2 comprising contacting the compound to be isomerized at a temperature in the range of about 80° to 160° C. with a catalyst composition comprising at least one copper compound selected from the group consisting of cupric naphthenate, cupric oleate, cupric stearate and cuprous chloride, and an alkyl, aryl, or alkoxy aryl urea containing no other substituents, said urea being present in an amount of between about 0.5 and 10 % by weight based on the total weight of dichlorobutenes and catalyst present in the reaction mixture, separating and recovering the isomer desired and recycling the isomer being transformed.

2. A process according to claim 1 wherein the isomerization is carried out at a temperature in the range of 100° to 130° C.

3. A process according to claim 1 wherein said urea is selected from the group consisting of methyl urea, tetramethyl urea, para-phenetyl urea, meta-tolyl urea, 1,3-ribenzyl urea, and 1,3-dicyclohexyl urea.

4. A process according to claim 1 wherein said copper compound is selected from the group consisting of halides, acetates, oleates, stearates and naphthenates of copper, and wherein said urea is selected from the group consisting of methyl urea, ethyl urea, isopropyl urea, phenyl urea, tetramethyl urea, para-phenetyl urea, meta-tolyl urea, 1,3-dibenzyl urea and 1,3-dicyclohexyl urea.

References Cited

UNITED STATES PATENTS

| 3,584,065 | 6/1971 | Oshuna | 260—654 R |
| 3,515,760 | 6/1970 | Wild | 260—654 R |
| 2,446,475 | 8/1948 | Hearne et al. | 260—654 R |

FOREIGN PATENTS

| 1,326,286 | 3/1963 | France | 260—654 R |

LEON ZITVAR, Primary Examiner

J. A. BOSKA, Assistant Examiner

U.S. Cl. X.R.

252—429, 431